(No Model.) 3 Sheets—Sheet 1.
E. B. HAYES.
MOLDING AND BLIND SLAT PLANING MACHINE.
No. 487,348. Patented Dec. 6, 1892.
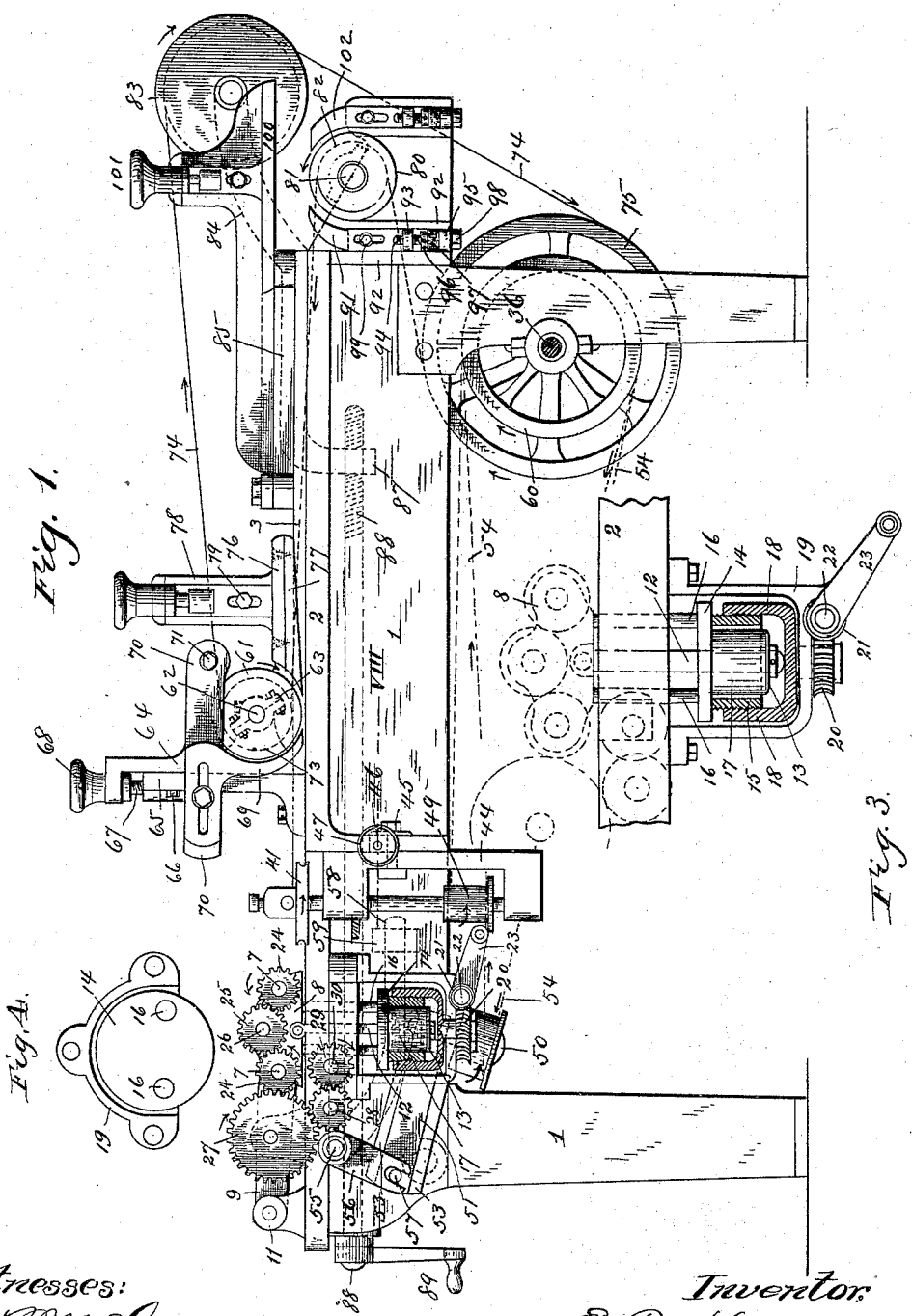

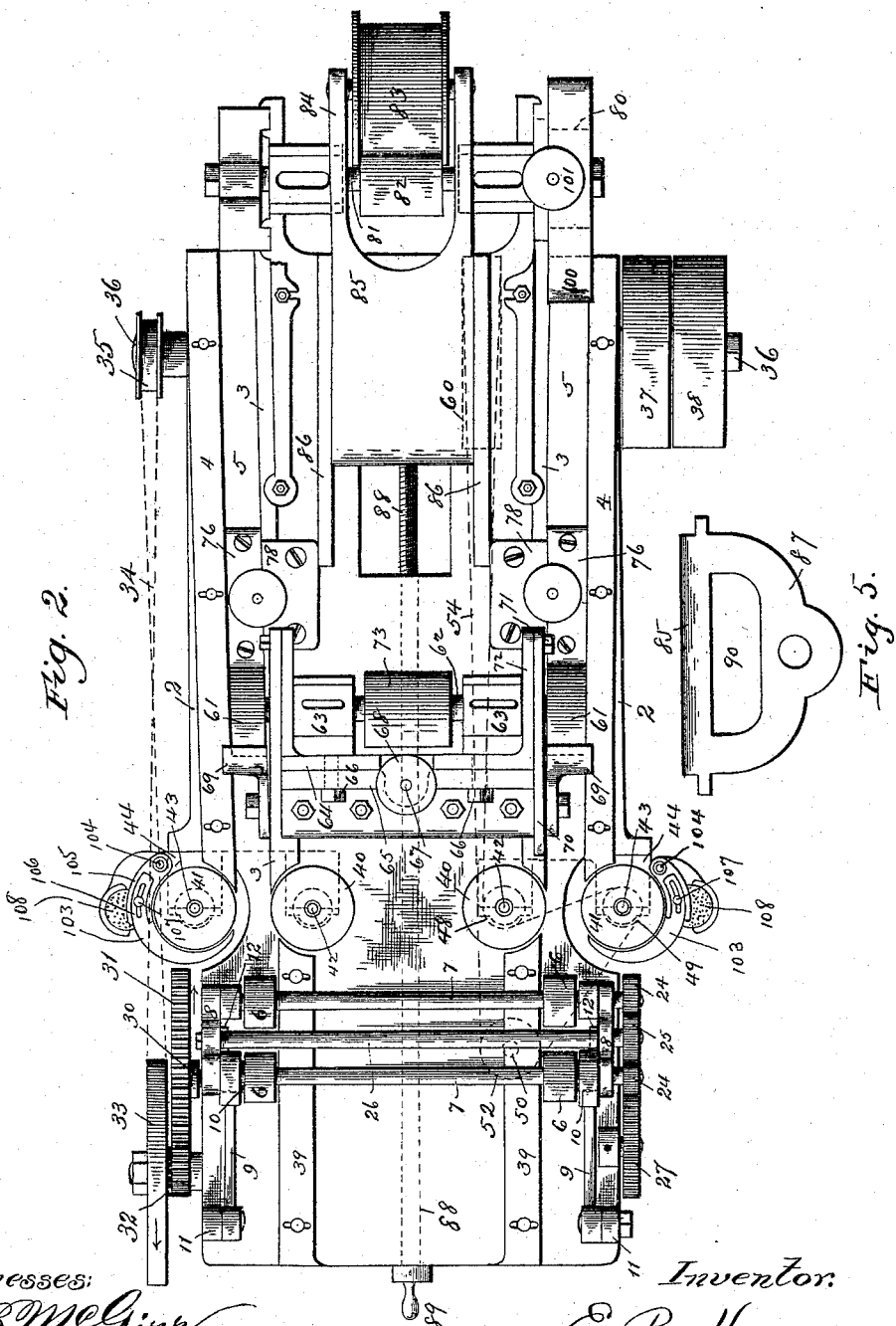

(No Model.) 3 Sheets—Sheet 3.
E. B. HAYES.
MOLDING AND BLIND SLAT PLANING MACHINE.
No. 487,348. Patented Dec. 6, 1892.
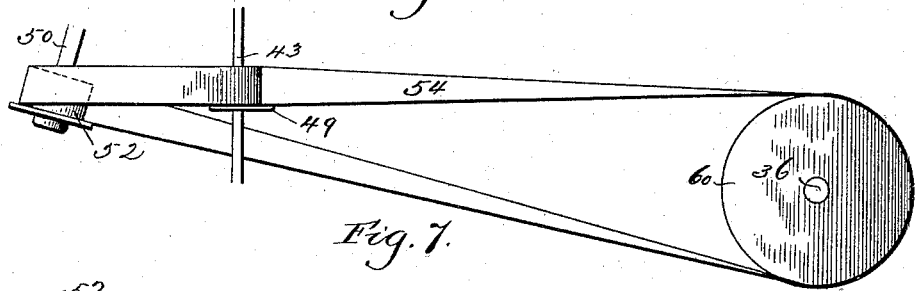
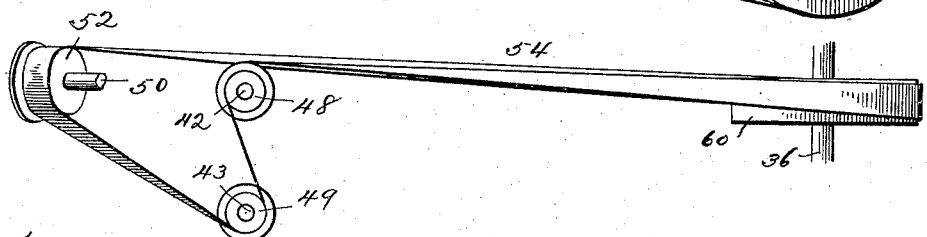
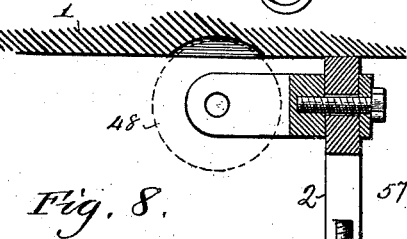
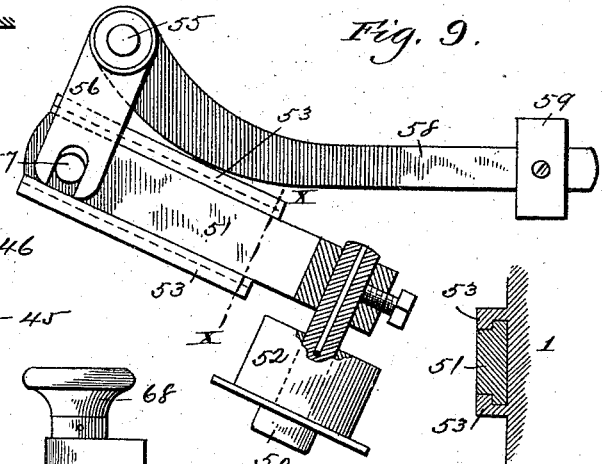
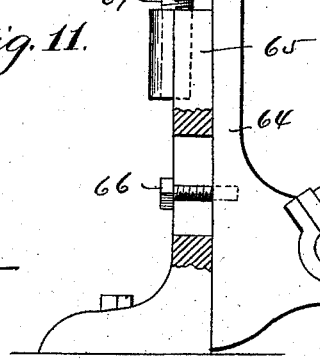

UNITED STATES PATENT OFFICE.

ELI B. HAYES, OF OSHKOSH, WISCONSIN.

MOLDING AND BLIND-SLAT-PLANING MACHINE.

SPECIFICATION forming part of Letters Patent No. 487,348, dated December 6, 1892.

Application filed November 9, 1891. Serial No. 411,313. (No model.)

*To all whom it may concern:*

Be it known that I, ELI B. HAYES, a citizen of the United States, residing at Oshkosh, in the county of Winnebago and State of Wisconsin, have invented certain new and useful Improvements in Molding and Blind-Slat-Planing Machines; and I do declare the following to be a full, clear, and exact description of the invention, such as will enable others skilled in the art to which it appertains to make and use the same.

It is the object of my present invention to provide a molding or planing machine adapted for operating on all four sides of two strips, slats, or pieces of lumber, in which the parts are arranged with a special view to simplicity and economy of manufacturing as well as efficiency in use. The machine is also adapted for sticking any pattern of molding, two pieces at a time and on all four sides of each piece, at one handling. The various cutting or operating heads are arranged so that they may be changed with great convenience and small loss of time, and by having the necessary heads ready the machine can be kept running without practical loss of time for the entire day. With regard to the labor of operating the machine one hundred per cent. is saved over the ordinary single molder or slat-planer—that is to say, the machine is capable of finishing double the number of lineal feet ordinarily produced with the same amount of labor. With regard to the belting I arrange the various pulleys so that little, if any, more is required than on a single machine, although twice as many cutters or operating-heads are run thereby.

In order to make my invention more clearly understood, I have shown in the accompanying drawings means for carrying the same into practical effect, without, however, intending to limit the application of my improvement to the exact construction which I have, for the sake of illustration, delineated.

In the drawings, Figure 1 is a side view of a double outside molder or blind-slat planer embodying my improvements. Fig. 2 is a plan view of the same. Figs. 3, 4, and 5 are detail views on a larger scale, illustrating parts of the machine, which are hereinafter more particularly referred to. Fig. 6 is a side view showing the belting on one side of the machine, that upon the other side being similarly arranged. Fig. 7 is a plan view of the same. Fig. 8 is a horizontal sectional view on line VIII VIII, Fig. 1. Fig. 9 is a side view of one of the inclined shafts or studs with its pulley, movable support, inclined guides, governing-arm, and weight. Fig. 10 is a transverse section on line X X, Fig. 9, of said guides and support. Fig. 11 is a side view, partly in section, of one of the shaft-bearings and its vertically-adjustable slide.

Referring to the drawings, 1 indicates the main frame of the machine, provided at each side with what I term an outside "planing-bed" or "horizontal table" 2. Each of these beds is provided with a longitudinal inside rest 3 and outside rest 4. Between the outer and inner walls of these rests is left a space 5, through which the slat or other material passes. These rests incline outward slightly, as seen in Fig. 2, in order that the feed-rolls may have a tendency to keep the material in close contact with the rest 3. Said rolls are shown at 6 in line with the spaces 5 and carried by transverse shafts 7, which are mounted in vertically-adjustable bearings or saddles 8. The latter are controlled as to longitudinal movement by links 9, pivoted to said saddles—as, for instance, upon trunnions 10 thereof concentric with one of the shafts 7—and pivoted at their outer ends to brackets 11 upon the main frame. Said saddles are further provided with bars or connections 12, which extend downward through the beds 2 and carry at their lower ends plates 13. 14 indicates a support above said plates and provided with screw-threaded portion 15 and with rods or braces 16, which extend up through the bed 2 and bear against the under side of the saddle 8.

Between the plate 13 and support 14 is situated a spring 17, which may be of rubber or metal, the former being illustrated. The screw-threaded portions 15 are cylindrical and serve to contain said springs and are engaged by correspondingly-threaded yokes 18, mounted in brackets 19, fixed to the main frame. Said yokes are provided with worm-wheels 20, by which they may be rotated, these wheels being in turn engaged and operated by worms 21 on a transverse shaft 22, the outer end of which is provided with a hand-crank 23. It will be seen from this construction that the feed-rolls are always drawn toward the bed 2 by the expansive force of the springs 17, the downward movement of the feed-rolls and saddles being limited by the rods 16, by which the feed-rolls may be vertically adjusted through the mechanism just described.

At one side of the machine the shafts 7 are provided with gear-pinions 24, which form, together with a connecting idler-pinion 25, mounted on a transverse shaft 26, a train of gearing, which is carried by and adjusted with the saddles 8.

27 is a gear-wheel mounted upon the main frame and engaging one of the gears of said train and is in turn operated by an idler 28. This last idler-pinion is engaged by a driving-pinion 29, carried by a transverse shaft 30, on the other end of which is mounted a gear-wheel 31, which in turn is driven by a pinion 32. The latter is formed with or attached to a belt-pulley 33, to which power is transmitted by a crossed belt 34, running from a small pulley 35 on the power-shaft 36 at the rear end of the machine. This shaft is provided with tight and loose pulleys 37 38, through the former of which all the various parts of the machine are driven from any suitable motor.

The arrows indicate the direction of motion of the various parts to which they are applied.

As the slats or other material are introduced into the front end of the machine, the left-hand end, as indicated in Figs. 1 and 2, they enter beneath the feed-rolls 6 and are immediately carried forward thereby along the outer face of the portion 39 of the inner side rest 3. The material so fed is first operated upon by the inner and outer edge cutters 40 and 41, which are mounted on vertical shafts 42 43. The latter are held in bearings on vertically-adjustable brackets 44, which can be clamped upon the main frame at any desired height by means of bolts 45. The brackets of the shafts 43 of the outer edge cutters can also be adjusted horizontally inward and outward by means of a screw-shaft 46, having a hand-wheel 47.

The shafts 42 and 43 are provided with belt-pulleys 48 49, and in front of the cutter 40 and its pulley 48 is mounted on an inclined shaft 50, carried by a movable support 51, an idler-pulley 52.

The main frame 1 is provided with inclined guides 53 at right angles to the shaft 50, and the support 51, which is engaged by said guides, is adjustable, with its pulley 52, toward and from the pulley 48. I prefer to make this adjustment automatic, according to the requirements of the belt 54, which passes around the pulleys 52, 48, and 49, and to that end there is mounted in the frame 1 a transverse rock-shaft 55, which is provided at each side of the machine with arms 56, having slots which engage pins 57 on the supports 51.

At any suitable point the shaft 55 is provided with a substantially-horizontal arm 58, on which is mounted a sliding weight 59. The arrangement of said parts is such that the tendency of said weight is toward a retraction of the pulley 52 away from the other pulleys with a force which can be regulated by the adjustment of the weight 59 in a well-known manner. Each belt 54, of which there is one at each side of the machine—one for each pair of edge cutter-heads—passes around said pulleys in the manner clearly shown in Fig. 2 and thence around a driving-pulley 60 on the horizontal shaft 36. The material is next operated upon by the top cutters 61, mounted in line with the spaces 5 and above the beds 2 on a horizontal shaft 62, running transversely across the machine and held in bearings 63 upon a vertically-adjustable slide 64. The latter is guided by a bracket 65, mounted upon the main frame, and is adapted to be firmly clamped in position by bolts 66, Fig. 2, when it has been adjusted by screw-shaft 67 and hand-wheel 68, so as to bring the cutters 61 at a proper height above the bed.

69 indicates a chip-breaker mounted in advance of the cutter and adapted to be adjusted toward and from the same by means of a bolt-and-slot connection with a hinged arm 70. Said arm is hinged in the sense that it may be turned upon its fulcrum pin or bolt 71; but when adjusted it is rigidly clamped by said bolt against the extension 72 of the bracket 65, which bracket thus carries the arm 70 and chip-breaker 69 in constant relation to the cutter.

The shaft 62 is provided between the bearings 63 with a central pulley 73, which is connected by a belt 74 with a driving-pulley 75 on the power-shaft 36.

76 indicates an adjustable top rest situated above the space 5, provided with a removable shoe 77, adapted to conform to the shape of the material as left by the top cutter 61 and adapted to be fixed at any desired height upon the stationary bracket 78 by means of a clamp-bolt 79.

The bottom cutters are situated at the rear end of the machine and are shown at 80, mounted upon a transverse shaft 81, below and in line with the space 5. Said shaft is provided with a belt-pulley 82, encircled or partly encircled by the belt 74. The latter is properly directed by an idler-pulley 83, situated above the bed of the machine. This idler is preferably mounted in the arm 84 of a sliding frame 85, which fits in suitable guides 86 of the main frame, so as to be capable of longitudinal adjustment. In order to effect this adjustment from the usual situation of the operator at the front end of the machine the frame 85 is provided with a downwardly-projecting screw-threaded lug 87, Figs. 1 and 5, which is engaged by a longitudinal screw-threaded central shaft 88, extending to the front of the machine and there provided with a hand crank or key 89. The lug 87 is centrally situated, and in order to provide for the passage of the similarly-situated belt 74 said lug has an opening or space 90, Fig. 5, through which the lower limb of the belt passes from the pulley 82 to the pulley 73. The two sets of top and bottom cutters, comprising four cutter-heads, are thus driven in the most direct and simple manner by a single belt.

91 is a chip-breaker situated in advance of the cutter 80 and adapted to move vertically in guides 92, fixed upon the main frame, it being provided with a screw-threaded lug 93, engaged by a screw 94. The latter is mounted in a fixed lug 95 and has a collar 96, which is secured to the screw. Between said collar and the lug 95 is interposed a yielding spring 97, of rubber or metal, which tends to hold the chip-breaker 91 with a yielding pressure against the under surface of the slat. The screw 94 may be rotated by means of the head 98 and the height of the chip-breaker and pressure of the spring 97 thus regulated.

99 is a bolt passing through a slot in the chip-breaker and serving to hold the latter in place in its guides 92 without preventing its vertical movement. Above and opposite to the cutter 80 is a top planing-bed 100, adapted to be adjusted toward and from the cutter by a screw 101. In the rear of the cutter 80 is situated a yielding support 102, which may be of the same general shape as the chip-breaker 91, and have also a yielding adjustment of a similar character to that of the breaker 91. The said parts 91 and 102 are thus pressed upward but yieldingly, so that they will hold the work firmly against the top bed, but will recede slightly to admit the work between their upper ends and said bed. The cutters 41 may also be provided with chip-breakers 103, partly encircling the cutter and pivoted at 104 to a suitable support. This chip-breaker of segmental form is made in two parts, one of which is provided with flanges 105, between which the slotted shank 106 of the other part may be adjusted and secured by a slot-and-bolt clamp 107.

108 is a rubber spring applied to the outer side of the chip-breaker and adapted to press the slat firmly inward against the rest 39.

The operation of the machine has been sufficiently set forth in the foregoing description.

What I claim is—

1. The herein-described molding or blind-slat-planing machine having at the outer sides thereof a bed and guiding devices for the slats or other material, a horizontal transverse shaft carrying top cutters above said beds, a transverse horizontal shaft carrying bottom cutters below said bed, drive-pulleys arranged centrally on said shafts, and inside and outside edge cutters at the sides of each bed, substantially as set forth.

2. In a machine of the character described, the combination of two beds and guiding devices, said beds being arranged, respectively, at the outer sides of the machine, edge cutters arranged at the sides of said beds, a horizontal shaft carrying top cutters, a bottom shaft carrying bottom cutters, pulleys on said shafts, a power-pulley, and a single central belt passing around said pulleys, substantially as set forth.

3. In a planing or molding machine, the combination, with the feed-rolls and their actuating-shafts, of saddle-pieces carrying bearings for the same, a plate or support adjustable toward and from said rolls, a bar or connection extending from one of said saddle-pieces beyond said support, a spring interposed between said support and connection and tending normally to force the feed-rolls toward the material fed, and means for adjusting the support, substantially as set forth.

4. The combination, with the feed-rolls and shafts, of bearings for the latter, saddles carrying said bearings, a main frame engaging and guiding said saddles, connecting-bars pivoted to said saddles, springs engaging said bars, supports oppositely engaging said springs and engaging the saddles, and a transverse shaft provided with means for simultaneously adjusting said supports, substantially as set forth.

5. In a planing or molding machine, the combination, with the edge cutters mounted on vertical shafts and a power-pulley mounted on a horizontal shaft, of an idler-pulley mounted upon an inclined axis and a single belt passing around said pulleys and actuating said cutters, substantially as set forth.

6. The combination of the edge cutters, vertical shafts carrying the same and provided with pulleys, a main frame provided with an inclined guide, a support fitting said guide and carrying upon an inclined axis an idler-pulley, a power-pulley mounted on a horizontal axis, a single belt passing around said pulleys, and means for adjusting said support, substantially as set forth.

7. The combination, with the main frame having a planing-bed and feeding and guiding devices at each side thereof, of a transverse shaft provided with a pulley and top cutters, a transverse shaft provided with a similar pulley and bottom cutters, a power-pulley and an idler-pulley mounted centrally of said frame, and a single belt passing around all of said pulleys, substantially as set forth.

8. The combination, with the main frame having a planing-bed and feeding and guiding devices at each side thereof, of a transverse shaft provided with a pulley and top cutters, a transverse shaft provided with a similar pulley and bottom cutters, a power-pulley, and an idler-pulley, a single belt passing around all of said pulleys, a sliding support carrying said idler-pulley, and a longitudinal rod extending from the front of the machine to said support for operating the latter, substantially as set forth.

9. The combination, with the top planing-bed, of an under rotary cutter, a yielding chip-breaker mounted in advance of said cutter, and a yielding support for the material, mounted in rear of the cutter and below the path of the material and adapted to hold the latter up and to yield downward to admit it, substantially as set forth.

10. The combination, with the feed-rolls and their transverse shafts, of gear-pinions 24 on the latter, an idler gear-pinion connecting said pinions and forming a train of gears, a transverse counter-shaft provided with a belt-pulley and a power-pinion 29, an idler-pinion 28, engaged by the latter, an idler gear-wheel 27, engaged by the last-mentioned idler and engaging one of the gears of said train, and means for adjusting the feed-rolls with said pinions 24 toward and from the bed of the machine, substantially as set forth.

11. The combination, with the cutter 61, of the vertically-adjustable bracket 65, having the arm 72, the arm 70, pivoted and adjustable thereon, and the slotted chip-breaker 69, longitudinally adjustable on the latter arm, substantially as set forth.

12. The combination, with the edge cutter 41, of the segmental adjustable chip-breaker 103, a pivoted support on which said chip-breaker is adjustable on a curve concentric with said cutter, and the spring 108, substantially as set forth.

13. The combination, with the cutter 80 and the top bed 100, of the chip-breaker 91, mounted in guides 92, the adjusting bolt or screw 94, having a fixed collar 96, and a spring sustaining the latter, substantially as set forth.

14. The combination, with the top and bottom cutters, of the central driving-pulleys 73 and 82, the pulley 75, the idler 83, the central belt 74, the adjustable frame 85 in the vertical plane of the belt carrying said idler and having a belt-opening 90, and means for adjusting said frame, substantially as set forth.

In testimony whereof I affix my signature in the presence of two witnesses.

ELI B. HAYES.

Witnesses:
CHAS. R. NEVITT, Jr.,
GEO. A. SMITH.